United States Patent [19]

Hashimoto et al.

[11] Patent Number: 5,484,661
[45] Date of Patent: Jan. 16, 1996

[54] MAGNETIC RECORDING MEDIUM HAVING A POLYVINYL ALKYL BINDER RESIN

[75] Inventors: Hiroshi Hashimoto; Masaki Satake; Yuichiro Murayama; Tsutomu Okita, all of Odawara, Japan

[73] Assignee: Fuji Photo Film Co., Ltd., Kanagawa, Japan

[21] Appl. No.: 179,942

[22] Filed: Jan. 11, 1994

[30] Foreign Application Priority Data

Jan. 12, 1993 [JP] Japan ................................ 5-003423

[51] Int. Cl.⁶ ............................................ G11B 5/00
[52] U.S. Cl. .............. 428/522; 428/694 B; 428/694 BS; 428/694 BM; 428/900
[58] Field of Search ................ 428/694 B, 694 BM, 428/694 BS, 500, 522, 523, 900

[56] References Cited

U.S. PATENT DOCUMENTS

| | | | |
|---|---|---|---|
| 3,647,464 | 3/1972 | Smith et al. .............................. 96/76 |
| 5,064,720 | 11/1991 | Kempo et al. ....................... 428/423.1 |
| 5,098,785 | 3/1992 | Yanagita et al. ........................ 428/332 |
| 5,244,739 | 9/1993 | Carlson et al. ....................... 428/425.9 |

FOREIGN PATENT DOCUMENTS 02220221  9/1990  Japan .

Primary Examiner—Stevan A. Resan
Attorney, Agent, or Firm—Sughrue, Mion, Zinn, Macpeak & Seas

[57] ABSTRACT

A binder for a magnetic recording medium which contains a polyvinyl alkylal resin modified by a sultone to introduce thereinto an atom group containing a polar group. Also disclosed is a magnetic recording medium that uses the above-described binder in a magnetic layer, a non-magnetic layer, a protective layer, an undercoat layer, etc. The binder and the magnetic recording medium are superior in dispersibility and exhibit high magnetic coating strength.

2 Claims, No Drawings

MAGNETIC RECORDING MEDIUM HAVING A POLYVINYL ALKYL BINDER RESIN

BACKGROUND OF THE INVENTION

The present invention relates to a binder for a magnetic recording medium which includes a magnetic layer containing a ferromagnetic fine powder, and also to a magnetic recording medium having on a non-magnetic support a magnetic layer made of a ferromagnetic fine powder dispersed in a binder, which has excellent electromagnetic transducing characteristics, durability and shelf stability.

Magnetic recording mediums are widely used as sound recording tapes, video tapes, floppy disks, or hard disks. A typical magnetic recording medium has a magnetic layer stacked on a non-magnetic support. The magnetic layer is made of a ferromagnetic powder dispersed in a binder.

Magnetic recording mediums are required to be on high levels in various characteristics such as electromagnetic transducing characteristics, running durability and running performance. More specifically, audio tapes for recording and reproducing music are demanded to have higher original sound reproducing capability. Video tapes are demanded to be excellent in original picture reproducing capability and other electromagnetic transducing characteristics.

Thus, magnetic recording mediums are demanded to have excellent running durability, as described above, as well as excellent electromagnetic transducing characteristics. To obtain excellent running durability, an abrasive and a lubricant are generally added to the magnetic layer.

However, it is necessary in order to obtain the required running durability by an abrasive to increase the amount of abrasive added to the magnetic layer to some extent. Consequently, the content of ferromagnetic powder lowers. When an abrasive having a relatively large particle size is used in order to obtain excellent running durability, the abrasive is likely to project excessively from the surface of the magnetic layer. Accordingly, it is likely that the improvement in the running durability by addition of an abrasive will result in deterioration of the electromagnetic transducing characteristics.

In order to improve the running durability by adding a lubricant, it is necessary to increase the amount of lubricant added. Consequently, it is likely that the binder will be plasticized and hence the durability of the magnetic layer will deteriorate.

A binder, which is one of the principal components of the magnetic layer, also performs an important roll in the improvement of the durability and electromagnetic transducing characteristics, as a matter of course. Examples of binders which have heretofore been used include vinyl chloride resins, cellulose resins, urethane resins, acrylic resins, etc. However, these conventional binders involve the problems that the resulting magnetic layer is inferior in wear resistance and that members of the magnetic tape running system are contaminated.

To solve these problems, a method wherein the hardness of the magnetic layer is increased by using a rigid binder has been adopted. However, an increase in the hardness of the magnetic layer causes the magnetic layer to become markedly brittle, which gives rise to problems such as occurrence of a dropout due to contact between the magnetic recording medium and a magnetic head, and deterioration of still characteristics.

Further, if a binder which has heretofore been employed as a binder for dispersing an abrasive and carbon black is used in a magnetic recording medium having a non-magnetic layer (intermediate layer) between a magnetic layer and a non-magnetic support, the dispersibility of an abrasive and carbon black is unsatisfactory, so that it is impossible to obtain a smooth magnetic layer having favorable surface properties as a top layer.

To solve the above-described problems, a magnetic recording medium containing a polyvinyl acetal resin material has been proposed in Japanese Patent Application Laid-Open (KOKAI) No. 01-236290 (1989). The binder disclosed in this publication is excellent in the dispersibility of a ferromagnetic powder and hence makes it possible to obtain a magnetic recording medium which is superior in electromagnetic transducing characteristics, wear resistance and heat resistance. However, polyvinyl acetal has only the OH group of vinyl alcohol as a polar group and contains no other polar group such as COOM or $SO_3M$ and is therefore unsatisfactory in terms of the dispersibility in the case of a magnetic recording medium that uses a ferromagnetic fine powder.

Japanese Patent Application Laid-Open (KOKAI) No. 02-220221 (1990) proposes a magnetic recording medium in which the dispersibility of polyvinyl acetal is improved by using as a binder a polyvinyl acetal resin material in which an atom group containing a polar group is coupled to the main chain of polyvinyl acetal. In the proposed magnetic recording medium, the dispersibility is improved to a certain extent by introducing an atom group having a polar group to the main chain of polyvinyl acetal. However, the polar groups cannot sufficiently exhibit their ability when adsorbed on the ferromagnetic powder. Therefore, the binder disclosed in the above-mentioned publication is still unsatisfactory in terms of dispersibility.

It is an object of the present invention to provide a binder for a magnetic recording medium which is made of a polyvinyl alkylal resin improved in dispersibility.

It is another object of the present invention to provide a magnetic recording medium which is superior in electromagnetic transducing characteristics.

SUMMARY OF THE INVENTION

The present invention provides a binder for a magnetic recording medium which contains a polyvinyl alkylal resin, wherein the polyvinyl alkylal resin has been modified by a sultone.

In addition, the present invention provides a binder for a magnetic recording medium in which the above-described polyvinyl alkylal resin has the following structure, which is obtained by alkylalization of a polyvinyl alcohol with an aldehyde:

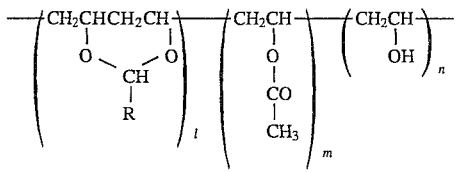

where l is not less than 50 mol %; n is not more than 35 mol %; and R is an alkyl group.

In addition, the present invention provides a magnetic recording medium having a magnetic layer containing a ferromagnetic powder and a binder, which is formed on at least one surface of a non-magnetic support, in which the binder contains a polyvinyl alkylal resin having a polymerization degree of 200 to 600 and modified by a sultone.

In addition, the present invention provides a magnetic recording medium having a non-magnetic support, a lower magnetic or non-magnetic layer provided on at least one surface of the non-magnetic support, and an upper magnetic layer provided on the lower magnetic or non-magnetic layer, in which at least one of the above-described two layers contains a binder for binding a ferromagnetic powder or a non-magnetic powder. The binder contains a polyvinyl alkylal resin having a polymerization degree of 200 to 600 and modified by a sultone.

DESCRIPTION OF THE PREFERRED EMBODIMENT

The present invention provides a binder for a magnetic recording medium which contains a polyvinyl alkylal resin obtained by acetalization of a polyvinyl alcohol with an aldehyde, e.g., polyvinyl acetal, polyvinyl butyral, etc., the polyvinyl alkylal resin being modified by a sultone to introduce a polar group-containing atom group thereinto.

The present invention also provides a magnetic recording medium containing the above-described binder.

In the polyvinyl alkylal resin modified by a sultone according to the present invention, the polar group-containing atom group, which is coupled to the main chain of the polyvinyl alkylal resin, is relatively long as shown below:

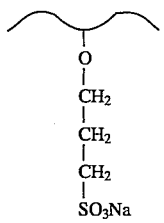

Therefore, the polyvinyl alkylal resin can exhibit satisfactory dispersibility when adsorbed on a ferromagnetic powder.

Meantime, the above-mentioned Japanese Patent Application Laid-Open (KOKAI) No. 02-220221 (1990), for example, states on page 3 thereof that hydrophilic atom groups are introduced by reaction of the following compounds:

Introduced compound                Compound (A)

  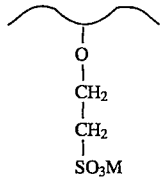

Introduced compound                Compound (B)

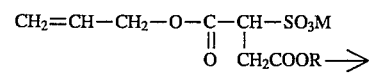  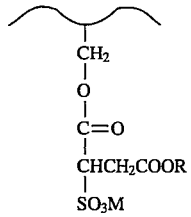

However, in a compound (A) obtained from the above-described compound, the linkage between the main chain and the polar group is short, so that the compound (A) cannot satisfactorily exhibit its ability when adsorbed on a ferromagnetic powder. Accordingly, satisfactory dispersibility cannot be obtained. Although there have been disclosed compounds having polar groups at a position relatively away from their main chains as in the case of a compound (B), these compounds have ester linkages between the main chains and the polar groups, and these ester linkages are readily hydrolyzed to become useless for dispersion. That is, such compounds do not satisfactorily contribute to improvement of dispersibility; rather than, they have an adverse effect on it.

In contrast, the compound of the present invention has a relatively long, polar group-containing atom group and is therefore effectively adsorbed on a ferromagnetic powder in such a manner as to wrap the latter satisfactorily. Thus, the binder of the present invention exhibits extremely excellent dispersibility.

In the following structural formula of a sultone-modified polyvinyl alkylal resin, which is to be contained in the binder of the present invention:

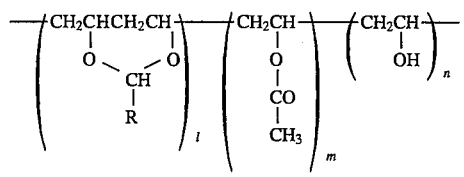

it is preferable that $l$ should be not less than 50 mol %, and $n$ should be not more than 35 mol %. If $n$ exceeds 35 mol %, the solubility of the compound in a solvent deteriorates, and the dispersibility lowers.

As R, which represents an alkyl group, methyl is preferable. As the number of carbon atoms increases, not only the dispersibility deteriorates, but also the glass transition temperature $Tg$ lowers, resulting in degradation of the durability of the resulting magnetic recording medium.

The glass transition temperature $Tg$ lowers according to the chain length as follows: In the case of $l=65$, $m=5$, and $n=30$, for example, when R is a methyl group, $Tg$ is approximately 100° C., and when R is a propyl group, $Tg$ is 70° C. When R is a propyl group, that is, when the compound is polyvinyl butyral, the resulting binder is approximately equal to vinyl chloride binders and is not particularly superior to them in terms of running durability.

The polyvinyl alkylal resin before modification with a sultone may be a mixture of a plurality of polyvinyl alkylal resins. The degree of polymerization of the polyvinyl alkylal is preferably in the range of from 200 to 600. If the degree of polymerization is excessively high, the dispersibility lowers because of high viscosity. On the other hand, if the polymerization degree is excessively low, the strength lowers, which is unfavorable in terms of durability.

Examples of sultones usable for modification of the polyvinyl alkylal resin in the present invention include propane sultone and butane sultone, which are shown below. Butane sultone is particularly preferable.

Propane sultone     Butane sultone

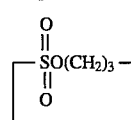   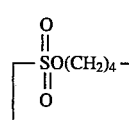

It is preferable to add a sultone in an amount of $1\times10^{-6}$ mol to $50\times10^{-5}$ mol to 1 g of resin solid content. If the amount of sultone added is outside the above range, the dispersibility lowers.

Modification of a polyvinyl alkylal resin by a sultone may be performed as follows: A polyvinyl alkylal resin is dissolved in an organic solvent, e.g., dimethylacetamide, and a 1% solution of sodium hydride (NaH) in dimethylformamide is added to the resin solution. Then, the mixture is stirred for 45 minutes in a stream of argon with the temperature held in the range of from −5° to 0° C. Thereafter, a sultone is added to the solution, and the resulting mixture is stirred for 2 hours at room temperature.

Then, an acetone-methanol mixed solvent is added to the resulting resin solution, and the solid content is taken out and dried.

In addition, various kinds of synthetic resin may be used in combination with the binder of the present invention. Examples of usable synthetic resins include ethylene-vinyl acetate copolymer, a cellulose derivative, e.g., nitrocellulose resin, an acrylic resin, a polyurethane resin, an epoxy resin, and a phenoxy resin. These synthetic resins may be used alone or as a mixture of two or more of them.

When another synthetic resin is used to form a magnetic layer in combination with the binder of the present invention, the sultone-modified polyvinyl alkylal resin contained in the magnetic layer is preferably not lower than 20 wt %, more preferably not lower than 30 wt %.

When polyurethane, which exhibits a great effect in improving the characteristics, is used in combination with a vinyl resin, the molecular weight of the polyurethane is preferably in the range of from 10,000 to 150,000 in terms of the weight-average molecular weight. If the molecular weight is higher than the upper limit of the above range, the viscosity is undesirably high, so that the dispersibility lowers. If the molecular weight is lower than the lower limit of the above range, the mechanical strength is low, so that the durability deteriorates.

As polyurethane, it is possible to use a polyurethane which is a reaction product obtained by using a polyol and a polyisocyanate as principal raw materials. More specifically, it is preferable to use a polyurethane produced from a raw material containing a polyol and a polyisocyanate as principal raw materials and further containing various additives including a chain extender. As the polyol, an aliphatic polyol is particularly preferable. The aliphatic polyol is preferably a polyol having a molecular weight of from 500 to 5,000 and containing an OH group at the end of a hydrocarbon chain. The OH group may be present at a position other than the end of the carbon chain. The molecular weight is preferably in the range of from 800 to 3,000. A molecular weight smaller than the lower limit of the above range provides unfavorable dispersibility. A molecular weight exceeding the upper limit of the above range lowers the solubility of the compound in a solvent, resulting in a lowering in the dispersibility. The carbon chain may be either a straight chain or a branched chain. Further, the carbon chain may be either saturated or unsaturated.

When an unsaturated polyolefin polyol or polybutadiene polyol is used as the aliphatic polyol, it is preferable to employ a polyol having a smaller number of unsaturated double bonds.

The polyolefin polyol content in the polyurethane is preferably in the range of from 20 wt % to 90 wt %. If the polyolefin polyol content is lower than the lower limit of the above range, the dispersibility is unfavorable, and the effectiveness of durability is small. On the other hand, if the polyolefin polyol content is higher than the upper limit of the above range, the glass transition temperature (Tg) lowers, so that it becomes difficult to control the physical properties of the resulting composition.

Preferable examples of the polyisocyanate used in the present invention are aromatic polyisocyanates such as MDI (4,4'-diphenylmethane diisocyanate), TDI (tolylene diisocyanate), and XDI (xylylene diisocyanate). Since the polyolefin polyol segment is soft, an aromatic diisocyanate enables easier adjustment of the physical properties.

Additives such as a chain extender may be used in addition to the polyol and the polyisocyanate. Examples of chain extenders usable in the present invention include glycols such as ethylene glycol, 1,4-butanediol, 2,3-butanediol, bisphenol A dihydroxyethyl ether, hydroquinone dihydroxyethyl ether, etc., and diamines such as diphenylmethanediamine, m-phenylenediamine, etc.

The end group of the polyurethane molecule is preferably an OH group. The OH group performs a crosslinking reaction with an isocyanate curing agent in the magnetic layer to enhance the strength of the magnetic coating film.

The glass transition temperature (Tg) of the polyurethane is preferably in the range of from −20° C. to +50° C. If the glass transition temperature is lower than the lower limit of the above range, the blocking tendency of the magnetic coating film before curing is weak. If the glass transition temperature is higher than the upper limit of the above range, the magnetic coating film becomes brittle, which is unfavorable from the viewpoint of durability.

The binder of the present invention, which contains a sultone-modified polyvinyl alkylal resin, preferably contains at least one polar group selected from among $-SO_3M$, $-OSO_3M$, $-COOM$, $-PO_3M'_2$, $-OPO_3M'_2$, $-NR_2$, $-N^+R_3X^-$, $-N^+R_2R'SO_3^-$, and $-N^+R_2R'COO^-$ (wherein M is a hydrogen atom, an alkali metal, an alkali earth metal, or an ammonium salt; M' is a hydrogen atom, an alkali metal, an alkali earth metal, an ammonium salt, or an alkyl group; R and R' are each an alkyl group; and X is a halogen). By virtue of the presence of such polar group, the dispersibility can be improved. The content of the polar group is preferably in the range of $1\times10^{-6}$ to $2\times10^{-3}$ equivalents per gram of the polymer. If the polar group content is higher than $2\times10^{-3}$ equivalents, the viscosity rises, and the dispersibility is likely to lower. If the polar group content is lower than $1\times10^{-6}$ equivalents, the dispersibility is likely to lower.

It is also possible to use a curing agent, e.g., a polyisocyanate compound in combination with the binder of the present invention. Examples of polyisocyanate compounds usable in the present invention include a reaction product obtained from 3 mols of tolylene diisocyanate and 1 mol of trimethylolpropane (e.g., Desmodur L-75 (Bayer), a reaction product obtained from 3 mols of a diisocyanate, e.g., xylylene diisocyanate or hexamethylene diisocyanate, and 1 mol of trimethylolpropane, a burette addition compound obtained from 3 mols of hexamethylene diisocyanate, an isocyanurate compound containing 5 mols of tolylene diisocyanate, an isocyanurate addition compound comprising 3 mols of tolylene diisocyanate and 2 mols of hexamethylene diisocyanate, and isophorone diisocyanate and diphenylmethane diisocyanate polymers.

The polyisocyanate compound in the magnetic layer is preferably contained in the binder in an amount in the range of from 10 wt % to 50 wt %, more preferably from 20 wt % to 40 wt %.

If an electron radiation curing process is carried out, a compound having a reactive double bond, e.g., urethane acrylate, may be used.

In general, the total amount of the resin component and the curing agent (i.e., the amount of the binder) is preferably in the range of from 15 parts to 40 parts by weight, more preferably from 20 parts to 30 parts by weight, per 100 parts by weight of a ferromagnetic powder.

The ferromagnetic powder used for the magnetic recording medium of the present invention is a ferromagnetic iron oxide powder, a cobalt-containing ferromagnetic iron oxide powder or a ferromagnetic alloy powder which has a $S_{BET}$ specific surface area of not smaller than 40 m$^2$/g (preferably not smaller than 50 m$^2$/g) and a crystallite size of not larger than 35 nm, preferably not larger than 25 nm. Examples of ferromagnetic powder usable in the present invention include Fe, Ni, Fe—Co, Fe—Ni, Co—Ni, Co—Ni—Fe and alloys containing aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, mercury, lead, phosphorus, lanthanum, cerium, praseodymium, neodymium, tellurium, or bismuth in an amount not more than 20 wt % of the metal component. It is also possible to use a ferromagnetic metal powder containing a small amount of water, a hydroxide or an oxide.

Methods of producing these ferromagnetic powders are already known. A ferromagnetic powder used in the present invention may be produced according to a known method.

There is no specific restriction on the shape of the ferromagnetic powder used in the present invention. Ferromagnetic powders in the form of needle, granule, dice, rice grain or plate may be generally used. It is particularly preferable to use a needle-shaped ferromagnetic powder.

The above-described resin component, curing agent and ferromagnetic powder are kneaded and dispersed in a solvent, which is usually used to prepare a magnetic coating material, e.g., methyl ethyl ketone, dioxane, cyclohexanone, ethyl acetate, etc. thereby preparing a magnetic coating material. The kneading process may be carried out according to a conventional method.

It should be noted that the magnetic coating material may contain in addition to the above-described components additives or fillers which are usually used, such as an abrasive, e.g., $\alpha$-Al$_2$O$_3$, Cr$_2$O$_3$, etc., an antistatic agent, e.g., carbon black, a lubricant, e.g., a fatty acid, fatty acid ester, silicone oil, etc., and a dispersant.

The magnetic coating material prepared using the above-described constituent materials is coated on a non-magnetic support to form a magnetic layer.

For example, the magnetic recording medium of the present invention is produced by a method wherein the surface of a non-magnetic support, which is traveling, is coated with a magnetic layer coating solution so that the dry film thickness of the magnetic layer is preferably in the range of from 0.5 μm to 10 μm, more preferably from 0.5 μm to 7.0 μm. A plurality of magnetic coating materials may be successively or simultaneously coated to form a multi-layer structure. Regarding the composition, physical properties, material, production method, etc. of each layer of a magnetic recording medium having two or more layers, e.g., a multi-magnetic layer structure, or a layer structure including a lower non-magnetic layer and an upper magnetic layer, those which are disclosed in Japanese Patent Application Laid-Open (KOKAI) Nos. 02-240824 (1990), 02 -21782 (1990), etc. may be used.

Examples of coating machines usable for coating the magnetic coating material include an air-doctor coater, a blade coater, a rod coater, an extrusion coater, an air-knife coater, a squeeze coater, an impregnation coater, a reverse-roll coater, a transfer roll coater, a gravure coater, a kiss-roll coater, a cast coater, a spray coater, a spin coater, etc. With regard to coating methods using these machines, for example, "Coating Technology" (Asakura Shoten, 1972) or "Progress of Coating Techniques" (K.K. Sogo Gijutsu Center, 1988) can be referred to.

The non-magnetic support used in the present invention may have a backing layer provided on the surface thereof where no magnetic coating material is coated. In general, the backing layer is provided by coating a backing layer forming coating material, which is obtained by dispersing granular components such as an abrasive and an antistatic agent and a binder in an organic solvent, on the surface of the non-magnetic support where no magnetic coating material is coated.

It should be noted that an adhesive layer may be provided on each of the surfaces of the non-magnetic support where the magnetic coating material and the backing layer forming coating material are coated, respectively.

The coated magnetic coating material is dried after the ferromagnetic powder contained in the magnetic coating layer has been subjected to magnetic field orientation.

After being dried, the coating layer is subjected to a surface smoothing treatment. For example, supercalender rolls may be used for the surface smoothing treatment. By the surface smoothing treatment, voids resulting from the removal of the solvent during the drying process disappear, and the packing factor of the ferromagnetic powder in the magnetic layer increases. Accordingly, a magnetic recording medium having high electromagnetic transducing characteristics can be obtained.

The magnetic recording medium of the present invention preferably has a surface which has such an extremely excellent smoothness that the center line average height of the surface is not larger than 4 nm (preferably in the range of from 1 nm to 3 nm) at a cut-off value of 0.25 mm. To obtain the required smoothness, for example, the recording layer formed by selecting a specific ferromagnetic powder and binder is subjected to the calendering treatment, as described above. In the calendering treatment, calender rolls are preferably operated under the conditions that the temperature is in the range of from 60° C. to 100° C. and the pressure is in the range of from 100 kg/cm$^2$ to 400 kg/cm$^2$.

The laminate cured in this way is cut into a desired shape.

The cutting may be carried out under usual conditions by using an ordinary cutting machine, for example, a slitter.

The binder of the present invention may be used for any of the layers constituting a magnetic recording medium, i.e., a magnetic layer, a non-magnetic layer, a backing layer, and a protective layer. The excellent dispersibility of the binder serves to improve the characteristics of each layer.

Thus, the magnetic recording medium binder and magnetic recording medium according to the present invention contain a polyvinyl alkylal resin modified by a sultone. Therefore, a magnetic layer or a non-magnetic layer formed using the binder of the present invention exhibits extremely high dispersibility. Accordingly, it is possible to obtain a magnetic recording medium which is superior in electromagnetic transducing characteristics and also excellent in long-term shelf stability and durability.

The present invention will be described below more specifically by way of Examples.

EXAMPLES

Example of modification of polyvinyl alkylal resins:

200 g of each polyvinyl alkylal resin shown in Table 1 below was dissolved in 800 g of dimethylacetamide to prepare a resin solution, and 38 ml of 1% solution of sodium hydride (NaH) in dimethylformamide was added to the resin solution. The resulting mixture was stirred for 45 minutes in a stream of argon with the temperature held in the range of from −5° to 0° C.

Then, 2.1 g of propane sultone or butane sultone was added to the solution, and the mixture was stirred for 2 hours at room temperature. Then, an acetone-methanol mixed solvent was added to the resulting resin solution, and the solid content was taken out and dried.

The sulfur content in the dried resin was determined by fluorescence X-rays analysis to confirm the degree of modification.

Examples 1 to 2 and Comparative Examples 1 to 2

100 parts by weight of a ferromagnetic alloy powder (composition: iron 94 wt %, zinc 4 wt %, and nickel 2 wt %; coercive force (Hc): 1,500 Oe; and crystallite size: 20 nm) was finely comminuted for 10 minutes in an open kneader. Then, 15 parts by weight of the corresponding binder shown in Table 1, 20 parts by weight of methyl ethyl ketone, and 30 parts by weight of cyclohexanone were added to the ferromagnetic alloy powder, and the mixture was kneaded for 60 minutes. Then, the following materials were added to the kneaded mixture:

| | |
|---|---|
| Polyurethane (UR8300, manufactured by Toyo Spinning Co., Ltd.) | 5 parts by weight (solid content) |
| Abrasive (alumina, particle size: 0.3 μm) | 2 parts by weight |
| Carbon black (particle size: 400 nm) | 2 parts by weight |
| Methyl ethyl ketone/toluene = 1/1 | 200 parts by weight |

The mixture was stirred for 120 minutes in a sand mill to disperse the additives. Then, the following materials were added to the resulting dispersion:

| | |
|---|---|
| Polyisocyanate (Coronate 3041, manufactured by Nippon Polyurethane Industry Co., Ltd.) | 3 parts by weight (solid content) |
| sec-butyl stearate | 1 part by weight |
| Butoxyethyl stearate | 1 part by weight |
| Stearic acid | 1 part by weight |
| Methyl ethyl ketone | 50 parts by weight |

The mixture was further stirred for 20 minutes and then filtered through a filter having an average pore size of 1 μm to prepare a magnetic coating material. The resulting coating material was coated on the surface of an aramid support of 8 μm in thickness by using a reverse roll so that the dry film thickness was 2.5 μm.

While the magnetic coating material was undried, the coated non-magnetic support was subjected to magnetic field orientation by using a magnet of 3,000 gauss and dried. Thereafter, the resulting magnetic recording medium was calendered by using a combination of 7 metal rolls (speed: 100 m/min; linear pressure: 300 kg/cm; and temperature: 90° C.), and then slit into a tape of 8 mm in width, thus preparing an 8-mm video tape as a sample.

Then, the characteristics of the 8-mm video tapes of Examples and those of Comparative Examples were measured by the following methods. The results of the measurement are shown in Table 1
(Measuring methods)
(1) Electromagnetic transducing characteristics:

A signal was recorded on each sample tape by using a Hi8-VTR (TR-705, a product of Sony Corporation) and reproduced. During the playback, the S/N ratio was measured with a noise meter and expressed in a value relative to the value of the tape of Comparative Example 2, which was defined as 0 dB.
(2) Surface roughness Ra:

The surface roughness of each sample tape was determined as a center line average height Ra by a light interference method using a digital optical profilometer (manufactured by WYKO) at a cut-off value of 0.25 min.

TABLE 1

| Sample | Resin before modification | | Compound used for modification | Chain structure on polar group side | Evaluation | |
|---|---|---|---|---|---|---|
| Ex.1 | R | $CH_3$ | Propane sultone | | Polar group cont. | 8 |
| | l | 75 | | | | |
| | m | 0.5 | | $OCH_2CH_2CH_2SO_3Na$ | | |
| | n | 24.5 | | | S/N | 1.1 |
| | p.d. | 300 | | | Ra | 2.7 |
| Ex.2 | R | $CH_3:C_4H_9 = 8:2$ | Butane sultone | | Polar group cont. | 15 |
| | l | 68 | | | | |
| | m | 5 | | $OCH_2CH_2CH_2CH_2SO_3Na$ | | |
| | n | 28 | | | S/N | 1 |
| | p.d. | 420 | | | Ra | 2.6 |
| Comp. Ex.1 | R | $CH_3$ | $ClCH_2CH_2SO_3Na$ | | Polar group cont. | 8 |
| | l | 75 | | | | |
| | m | 0.5 | | $OCH_2CH_2SO_3Na$ | | |
| | n | 24.5 | | | S/N | 0.5 |
| | p.d. | 300 | | | Ra | 3.1 |
| Comp. Ex.2 | R | $CH_3$ | Non-modified | None | Polar group cont. | 0 |
| | l | 75 | | | | |
| | m | 0.5 | | | | |
| | n | 24.5 | | | S/N | 0 |
| | p.d. | 300 | | | Ra | 3.5 |

Examples 3 to 4 and Comparative Examples 3 to 4

The following materials were mixed and stirred for 12 hours in a disperse-stirrer to prepare an undercoating solution:

| | |
|---|---|
| Polyester resin | 100 parts by weight |
| (containing —$SO_3Na$ group) | |
| Tg: 65° C. | |
| Na content: 4,600 ppm | |
| Cyclohexanone | 9,900 parts by weight |

The undercoating solution thus obtained was coated on a non-magnetic support of polyethylene terephthalate (thickness: 10 μm; F5 value: 20 kg/mm² in the MD direction and 14 kg/mm² in the TD direction; and Young's modulus: 750 kg/mm² in the MD direction and 470 kg/mm² in the TD direction) by a bar coater so that the dry film thickness was 0.1 μm.

In the meantime, an upper magnetic layer coating solution and a lower non-magnetic layer coating solution were prepared according to the following formulation:

| | |
|---|---|
| Ferromagnetic powder | 100 parts by weight |
| Fe alloy powder (Fe—Co—Ni) | |
| Composition: Fe:Co:Ni = 92:6:2 | |
| $Al_2O_3$ used as an anti-sintering agent | |
| Hc: 1,600 Oe; $\delta_s$: 119 emu/g | |
| Major axis length: 0.13 μm; acicular ratio: 7 | |
| Crystallite size: 17.2 nm; water content: 0.6 wt % | |
| Polyvinyl alkylal resin in Table 2 | 13 parts by weight |
| Polyurethane resin | 5 parts by weight |
| (UR8300, manufactured by Toyo Spinning Co., Ltd.) | |
| α-alumina | 12 parts by weight |
| Average particle size: 0.15 μm | |
| $S_{BET}$: 8.7 m²/g; pH: 8.2 | |
| Water content: 0.06 wt % | |
| Cyclohexanone | 150 parts by weight |
| Methyl ethyl ketone | 150 parts by weight |

The above-described composition was mixed and dispersed for 6 hours in a sand mill. Thereafter, 5 parts by weight of polyisocyanate (Coronate L), 5 parts by weight of oleic acid, 7 parts by weight of stearic acid, and 15 parts by weight of butyl stearate were added to the resulting dispersion to obtain an upper magnetic layer coating solution.

| Formulation of the lower non-magnetic layer coating solution: | |
|---|---|
| $TiO_2$ | 85 parts by weight |
| Average particle size: 0.035 μm | |
| Crystalline form: rutile | |
| TiO2 content: not lower than 90% | |
| Surface treatment layer: $Al_2O_3$ | |
| $S_{BET}$: 35 to 45 m²/g | |
| True specific gravity: 4.1 | |
| pH: 6.5 to 8.0 | |
| Carbon black | 5 parts by weight |
| Average particle size: 160 nm | |
| DBP oil absorption: 80 ml/100 g | |
| pH: 8.0 | |
| $S_{BET}$: 250 m²/g | |
| Tinting strength: 143% | |
| Polyvinyl alkylal resin in Table 2 | 13 parts by weight |
| Polyurethane resin | 5 parts by weight |
| (UR8300, manufactured by Toyo Spinning Co., Ltd.) | |
| Cyclohexanone | 100 parts by weight |
| Methyl ethyl ketone | 100 parts by weight |

The above-described composition was mixed and dispersed for 4 hours in a sand mill. Thereafter, 5 parts by weight of polyisocyanate (Coronate L), 5 parts by weight of oleic acid, 5 parts by weight of stearic acid, and 15 parts by weight of butyl stearate were added to the resulting dispersion to obtain a lower non-magnetic layer coating solution.

The above-described coating solutions were coated in a wet state by using two doctors having different gaps. Thereafter, the wet coating was subjected to magnetic field orientation by using a permanent magnet of 3,500 gauss and then an electromagnet of 1,600 gauss and dried. Thereafter, supercalendering was carried out at a temperature of 80° C. by a combination of two metal rolls. The coating thicknesses of the magnetic and non-magnetic layers were 0.3 μm and 3.0 μm, respectively.

Then, a coating solution for a back coat layer was prepared according to the following formulation:

| | |
|---|---|
| Carbon black | 100 parts by weight |
| $S_{BET}$: 220 m²/g | |
| Average particle size: 170 nm | |
| DBP oil absorption: 75 ml/100 g | |
| Volatile content: 1.5% | |
| pH: 8.0 | |
| Bulk density: 240.2 kg/m³ | |
| Nitrocellulose | 100 parts by weight |
| RSI/2 (manufactured by Daicel Ltd.) | |
| Polyurethane | 30 parts by weight |
| Dispersant | |
| copper oleate | 10 parts by weight |
| copper phthalocyanine | 10 parts by weight |
| barium sulfate | 5 parts by weight |
| (precipitable) | |
| Methyl ethyl ketone | 500 parts by weight |
| Toluene | 500 parts by weight |

The above-described composition was pre-kneaded and then kneaded in a roll mill. To 100 parts by weight of the composition obtained, the following additives were added and dispersed in a sand grinder:

| | |
|---|---|
| Carbon black | 100 parts by weight |
| SBET: 200 m²/g | |
| Average particle size: 0.2 μm | |
| DBP oil absorption: 36 ml/100 g | |
| pH: 8.5 | |
| α-$Al_2O_3$ | 0.1 part by weight |
| Average particle size: 0.2 μm | |
| After filtration, the following composition was added to 100 parts by weight of the above-described composition to prepare a coating solution: | |
| Methyl ethyl ketone | 120 parts by weight |
| Polyisocyanate | 5 parts by weight |

The coating solution thus obtained was coated on the back surface of the non-magnetic support, which was reverse to the surface where the magnetic layer was provided, by a bar coater so that the dry film thickness was 0.5 μm. The magnetic recording medium obtained in this way was cut into a width of 8 mm, thereby preparing an 8-mm video tape. The characteristics of each sample video tape were measured by the same methods as in Examples 1 and 2. The results of the measurement are shown in Table 2 below.

TABLE 2

| Sample | Resin before modification | | Compound used for modification | Chain structure on polar group side | Evaluation | |
|---|---|---|---|---|---|---|
| Ex.3 | R | $CH_3$ | Propane sultone | | Polar group cont. | 8 |
| | l | 75 | | | | |
| | m | 0.5 | | $OCH_2CH_2CH_2SO_3Na$ | | |
| | n | 24.5 | | | S/N | 1.4 |
| | p.d. | 300 | | | Ra | 2.1 |
| Ex.4 | R | $CH_3$:$C_4H_9$ = 8:2 | Butane sultone | | Polar group cont. | 15 |
| | l | 68 | | | | |
| | m | 5 | | $OCH_2CH_2CH_2CH_2SO_3Na$ | | |
| | n | 28 | | | S/N | 1.2 |
| | p.d. | 420 | | | Ra | 2.2 |
| Comp. Ex.3 | R | $CH_3$ | $ClCH_2CH_2SO_3Na$ | | Polar group cont. | 8 |
| | l | 75 | | | | |
| | m | 0.5 | | $OCH_2CH_2SO_3Na$ | | |
| | n | 24.5 | | | S/N | 0.4 |
| | p.d. | 300 | | | Ra | 3.0 |
| Comp. Ex.4 | R | $CH_3$ | Non-modified | None | Polar group cont. | 0 |
| | l | 75 | | | | |
| | m | 0.5 | | | | |
| | n | 24.5 | | | S/N | 0 |
| | p.d. | 300 | | | Ra | 3.4 |

Note: p.d. represents polymerization degree; the polar group content is × $10^{-5}$ eq/g; S/N is expressed in dB; and the average of roughness height Ra is expressed in nm.

Examples 5 to 6 and Comparative Examples 5 to 6

Upper and lower magnetic layer coating solutions having the following compositions were prepared.

Upper-layer solution:

| | |
|---|---|
| CO-γ-FeOx (x = 1.45; major axis length: 0.20 μm Hc: 950 Oe; and Br: 1,600 gauss) | 100 parts by weight |
| Polyvinyl alkylal resin (shown in Table 3) | 10 parts by weight |
| Polyurethane (UR8300, manufactured by Toyo Spinning Co., Ltd.) | 5 parts by weight |
| Polyisocyanate (Coronate L) | 6 parts by weight |
| Stearic acid (for industrial use) | 1 part by weight |
| Butyl stearate (for industrial use) | 1 part by weight |
| α-alumina (particle size: 0.2 μm) | 10 parts by weight |
| Electrically conductive carbon (particle size: 70 nm) | 1 part by weight |
| Methyl ethyl ketone/cyclohexanone (= 7/3) solvent | 200 parts by weight |

Lower-layer solution (solution B):

| | |
|---|---|
| CO-γ-FeOx (x = 1.45; major axis length: 0.25 μm Hc: 850 Oe; and Br: 1,400 gauss) | 100 parts by weight |
| Polyvinyl alkylal resin (shown in Table 3) | 11 parts by weight |
| Polyurethane (UR8300, manufactured by Toyo spinning Co., Ltd.) | 4 parts by weight |
| Polyisocyanate (Coronate L) | 6 parts by weight |
| Stearic acid (for industrial use) | 1 part by weight |
| Butyl stearate (for industrial use) | 1 part by weight |
| Electrically conductive carbon (particle size: 20 nm) | 5 parts by weight |
| Methyl ethyl ketone/cyclohexanone (= 7/3) solvent | 200 parts by weight |

The coating solutions were prepared by using a kneader, a sand grinder, etc., and coated on a non-magnetic support by a simultaneous multi-layer coating process. As the non-magnetic support, a polyethylene terephthalate film having a center line average height (Ra) of 4 nm and a thickness of 14 μm was used. After the coating process, the non-magnetic support was oriented in the longitudinal direction and then dried to obtain a bulk roll. The bulk roll thus obtained was further subjected to calender roll treatment. The calender roll treatment was carried out by using 7 stages of metal rolls having a Shore A hardness of 80 degrees and Ra of 0.5 nm at a temperature of 80° C. and a linear pressure of 300 kg/cm. After the calender roll treatment, bulk thermotreatment was carried out for 24 hours at 60° C. to cure the magnetic layers. Thereafter, the resulting magnetic recording medium was slit into a tape of ½ inch in width, thus obtaining a video tape. The surface roughnesses of the video tapes thus obtained were all in the range of from 5 nm to 6 nm. Each video tape obtained was incorporated in an S-VHS cassette to prepare a video cassette tape, and the characteristics thereof were measured by the same methods as in Examples 1 and 2. The results of the measurement are shown in Table 3 below.

TABLE 3

| Sample | Resin before modification | | Compound used for modification | Chain structure on polar group side | Evaluation | |
|---|---|---|---|---|---|---|
| Ex.5 | R | CH$_3$ | Propane sultone | | Polar group cont. | 8 |
| | l | 75 | | | | |
| | m | 0.5 | | OCH$_2$CH$_2$CH$_2$SO$_3$Na | | |
| | n | 24.5 | | | S/N | 1.3 |
| | p.d. | 300 | | | Ra | 4.3 |
| Ex.6 | R | CH$_3$:C$_4$H$_9$ = 8:2 | Butane sultone | | Polar group cont. | 15 |
| | l | 68 | | | | |
| | m | 5 | | OCH$_2$CH$_2$CH$_2$CH$_2$SO$_3$Na | | |
| | n | 28 | | | S/N | 1.2 |
| | p.d. | 420 | | | Ra | 4.4 |
| Comp. Ex.5 | R | CH$_3$ | ClCH$_2$CH$_2$SO$_3$Na | | Polar group cont. | 8 |
| | l | 75 | | | | |
| | m | 0.5 | | OCH$_2$CH$_2$SO$_3$Na | | |
| | n | 24.5 | | | S/N | 0.2 |
| | p.d. | 300 | | | Ra | 5.1 |
| Comp. Ex.6 | r | CH$_3$ | Non-modified | None | Polar group cont. | 0 |
| | l | 75 | | | | |
| | m | 0.5 | | | | |
| | n | 24.5 | | | S/N | 0 |
| | p.d. | 300 | | | Ra | 5.3 |

Note: p.d. represents polymerization degree; the polar group content is × 10$^{-5}$ eq/g; S/N is expressed in dB; and the average of roughness height Ra is expressed in nm.

As has been described above, the present invention provides a binder containing a polyvinyl alkylal resin modified by a sultone so that an atom group having SO$_3$Na at the end of an aliphatic chain is coupled to the main chain of the resin. Accordingly, since the SO$_3$Na portion lies considerably away from the main chain, it is extremely readily adsorbed on the ferromagnetic powder. The main and side chains are carbon chains, which wrap the ferromagnetic powder satisfactorily. Thus, the binder exhibits superior dispersibility.

In comparison to vinyl chloride copolymers, which have heretofore commonly been used, the polyvinyl alkylal resin is free from dehydrochlorination and therefore improves the durability of the binder.

In addition, since the glass transition temperature Tg is high, mechanical characteristics are high, and extremely excellent durability can be obtained. In other words, it is possible to attain a binder for a magnetic recording medium which exhibits high durability and high dispersibility. The binder can be used not only for a magnetic layer in which it combines with a ferromagnetic powder but also for a non-magnetic layer or a backing layer in which it combines with a non-magnetic powder, e.g., an abrasive, a filler, carbon black, etc. The binder can also be used for a protective layer or an undercoat layer in which no powder material is used in combination with it. Thus, the binder of the present invention can be used for any portion of a magnetic recording medium.

What we claim is:

1. A magnetic recording medium having a magnetic layer containing a ferromagnetic powder and a binder, which is formed on at least one surface of a non-magnetic support, wherein said binder contains a polyvinyl alkylal resin having a polymerization degree of 200 to 600 and modified by a sultone to attach an —O(CH$_2$)$_x$SO$_3$Na group directly to the main chain of the polyvinyl alkylal resin where x is an integer of 3 or 4 and having the following structure, which is obtained by alkylalization of a polyvinyl alcohol with an aldehyde:

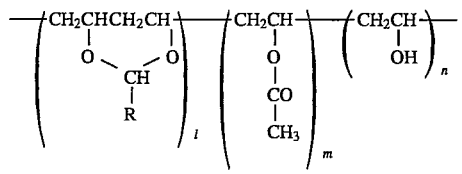

wherein l is not less than 50 mol %; n is not more than 35 mol %; m is 50% mol % or less; and R is an alkyl group.

2. A magnetic recording medium having a non-magnetic support, a lower magnetic or non-magnetic layer provided on at least one surface of said non-magnetic support, and an upper magnetic layer provided on said lower magnetic or non-magnetic layer, wherein at least one of said two layers contains a binder for binding a ferromagnetic powder or a non-magnetic powder, said binder containing a polyvinyl alkylal resin having a polymerization degree of 200 to 600 and modified by a sultone to attach an —O(CH$_2$)$_x$SO$_3$Na group directly to the main chain of the polyvinyl alkylal resin where x is an integer of 3 or 4 and having the following structure, which is obtained by alkylalization of a polyvinyl alcohol with an aldehyde:

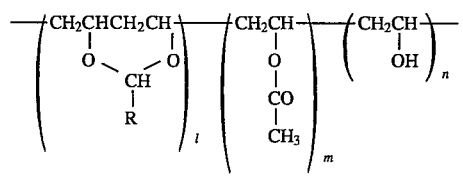

wherein l is not less than 50 mol %; n is not more than 35 mol %; m is 50% mol % or less; and R is an alkyl group.

* * * * *